Feb. 20, 1940. F. J. VIERLING 2,190,899
GAUGE
Filed July 18, 1938
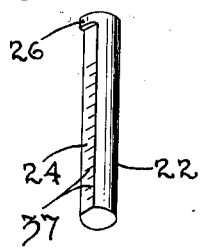
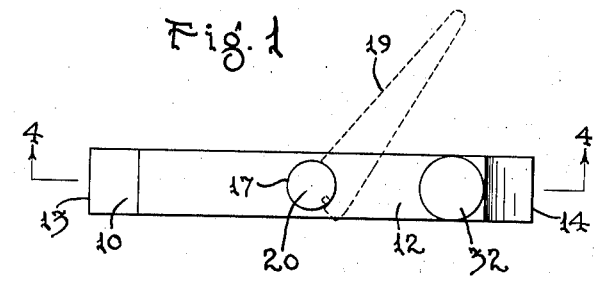
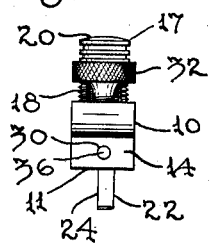
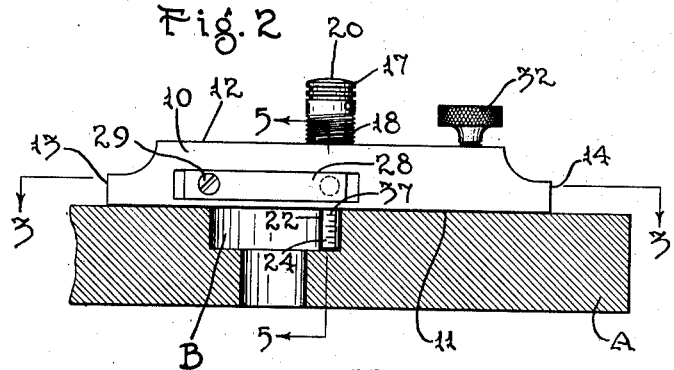
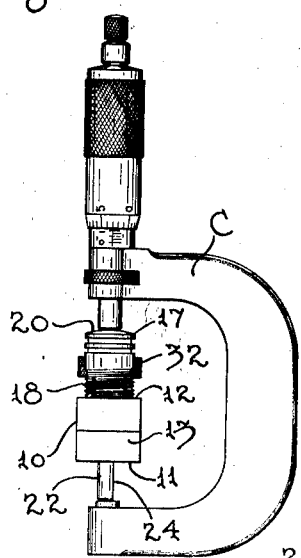
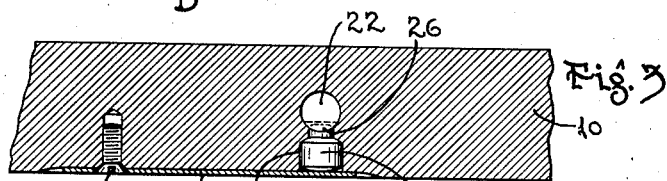
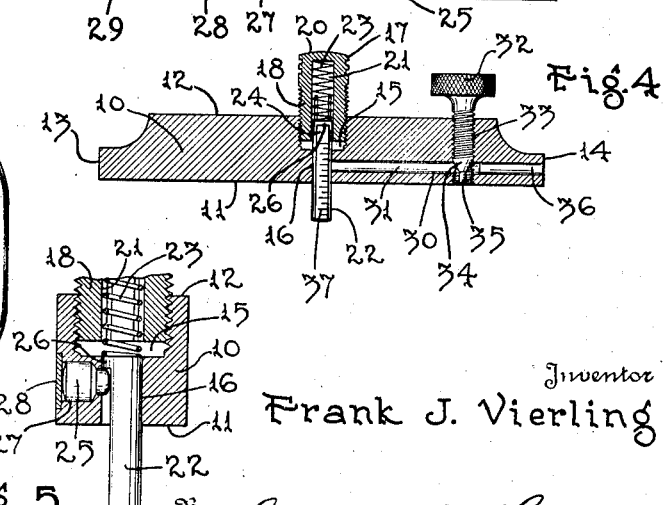
Inventor
Frank J. Vierling
By Caswell + Lagaard
Attorneys Patented Feb. 20, 1940

2,190,899

UNITED STATES PATENT OFFICE 2,190,899

GAUGE

Frank J. Vierling, Minneapolis, Minn.

Application July 18, 1938, Serial No. 219,762

4 Claims. (Cl. 33—169)

This invention relates to a gauge useful for many purposes, but more especially adapted to be employed as a depth gauge.

An object of the invention is to provide a gauge wherein will be incorporated various improved features and characteristics of construction.

And a further object is to provide a simple, durable, efficient, novel and improved depth gauge.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a plan view of a gauge made according to the invention;

Fig. 2 is a side elevational view of the gauge of Fig. 1 shown applied to use as a depth gauge;

Fig. 3 is an enlarged fragmentary horizontal sectional view, taken on line 3—3 in Fig. 2;

Fig. 4 is a vertical central longitudinal sectional view, taken on line 4—4 in Fig. 1;

Fig. 5 is an enlarged fragmentary transverse sectional view, taken on line 5—5 in Fig. 2;

Fig. 6 is an end elevational view of the gauge as seen from the left in Figs. 1, 2 and 4, disclosing said gauge applied to use in connection with a vernier caliper or micrometer;

Fig. 7 is an end elevational view of the gauge disclosing the end thereof opposite that shown in Fig. 6; and Fig. 8 is a perspective view of a measuring element or rod of the gauge removed from the stock thereof.

With respect to the drawing and the numerals of reference thereon, a gauge stock is designated of reference thereon. As disclosed, the stock 10 is of oblong configuration and includes a lower machined surface 11. The upper surface 12 of said stock is for convenience parallel with the lower surface 11 thereof. Opposite end surfaces of the stock include portions 13 and 14 thereof which are parallel with each other and are perpendicular to the lower machined surface 11 and the upper surface 12.

Said stock 10 includes a cylindrical, internally threaded opening or chamber 15 therein extending downwardly from the upper surface 12 of the stock. As shown, the opening or chamber 15 is disposed at the longitudinal and transverse center of the upper surface 12, extends in perpendicular relation to the lower machined surface 11, and terminates at about the mid-thickness of the stock. A guide channel or way 16 of smaller diameter than the opening or chamber 15 extends centrally from the inner portion of said opening or chamber 15 to and through the lower machined surface 11 in perpendicular relation to said machined surface. It will be seen that the guide channel or way 16 constitutes a continuation of the opening or chamber 15 extending from the center of the base of said opening or chamber.

A hollow measuring element or nut 17 includes a lower, externally threaded portion 18 thereof threaded into the internally threaded opening or chamber 15. Desirably, said lower, externally threaded portion 18 is suitably split and associated with the internal thread of said opening or chamber 15 so that said element or nut is turnable only under the application of considerable force. The hollow measuring element or nut 17 is set into the opening or chamber 15 a predetermined distance, as by employment of a spanner wrench 19 (dotted lines, Fig. 1) to rotate said element or nut. Any given setting of said element 17 is adapted to make the perpendicular measurement from the top or outer surface 20 of the hollow measuring element or nut to the lower machined surface 11 of the stock 10 of the gauge a predeterminedly selected measurement. Such measurement evidently can be altered at will by rotation of the element or nut 17 in the internally threaded opening or chamber 15.

The element or nut 17 includes a concavity 21 which extends from location in said element or nut adjacent its top or upper surface 20 to and through the lower or inner end of the element or nut. More explicitly, the concavity 21 opens at its lower or inner part to the lower portion of the opening or chamber 15 and is in axial alignment with the guide channel or way 16.

A measuring element or rod 22 of the gauge has its upper portion disposed in or adapted to enter the lower part of the concavity 21, its intermediate portion disposed in the guide channel or way 16, and its lower portion arranged to extend outwardly of the stock 10 beyond its machined surface 11. The element or rod 22 is snugly slidable in the guide channel or way 16 and the concavity 21 and is normally resiliently urged outwardly of the stock 10 and its surface 11 through the instrumentality of a helical spring 23 in the upper portion of said concavity 21, between the upper or outer end of the concavity and the upper or inner end of said element or rod 22.

The measuring element or rod 22 has a flat side 24 which is engaged by a guide member 25 for said element or rod. A shoulder 26 upon the element or rod 22 at the upper or inner end of the flat side 24 constitutes a stop for precluding accidental removal of said element or rod from the guide channel or way 16 past the guide and latch member 25. Said member 25 is slidably arranged in a horizontal bore 27 in the stock 10 for movement toward and away from the element or rod 22, and a flat spring 28, recessed in and secured to said stock by an anchoring screw 29, resiliently urges the guide member 25 into engagement with said flat side 24. Obviously, the element or rod 22 is readily removable from the stock by the exertion of an outward pull thereon of sufficient magnitude to cause the flat spring 28 to flex to an extent permitting the shoulder 26 to be forced past said member 25. An element or rod can replace a removed element or rod by pushing in the substitute element or rod past said guide and latch member 25, the flat spring of course being caused to flex outwardly. Elements or rods 22 of variable length suitable to different purposes can be employed.

A longitudinal bore 30 extends through the stock 10 from the end surface 14 thereof inwardly, and the inner end of said longitudinal bore 30 communicates with the guide channel or way 16. A pin 31 serves to clamp the element or rod 22 in the guide channel or way 16 so that it will have fixed relation to the stock 10 when desired. Said pin 31 is situated in the inner end portion of the longitudinal bore 30 and extends between said guide channel or way 16 and a clamp screw 32 for the pin. The clamp screw 32 is fitted in an internally threaded opening 33 in the stock. As shown, the opening 33 is parallel with the opening or chamber 15 and perpendicular to the lower machined surface 11. A lower portion of said clamp screw 32 includes a conical cam surface 34 for engagement with the adjacent end of the pin 31. An extension piece 35 of the clamp screw, below the conical cam surface 34, serves to preclude movement of said pin 31 to position directly beneath the axis of said clamp screw when the conical cam surface 34 is disengaged from the pin 31. The outer end portion of the longitudinal bore 30 is closed by a plug 36. Clearly, by turning down the clamp screw 32 the conical cam surface 34 is caused to engage the rounded end of the pin 31 and cause said pin to be slid to clamping relation against the element or rod 22, and by loosening said clamping screw said pin 31 is caused to be released from locking engagement against said element or rod.

In Fig. 2 the device is shown applied to use as a depth gauge. The lower machined surface 11 rests upon the upper surface of a block A provided with a cut-out or bore B so that the lower end of the measuring element or rod 22 engages the base of said cut-out or bore B. While accomplishing the result, as in said Fig. 2, the clamp screw 32 would be loosened to cause the pin 31 to be released from the element or rod 22. Said element or rod first engaged the base of the cut-out or bore B and upon downward movement of the stock 10 thereafter to engagement with the block A the measuring element or rod was made to move inwardly of the guide channel or way 16 and the concavity 21 against the resilient action of the helical spring 23. While the parts of the gauge are situated, as in Fig. 2, the clamp screw 32 is turned down or tightened to cause the pin 31 to engage and fix the element or rod 22 against longitudinal movement. The known distance between the top or outer surface 20 of the element or nut 17 and the lower machined surface 11 of the stock plus the length of the portion of the element or rod 22 below or at the outer side of said lower machined surface, as in said Fig. 2, may constitute the measurement by reference to which the depth of the bore B is determined, as by placing the depth gauge in a vernier caliper or micrometer C (Fig. 6). Or the gauge may be adjusted to desired measurement in the vernier caliper or micrometer and the element or rod 22 there locked in fixed relation to the stock and said gauge afterward applied to a cut-out or bore, such as B, of a block or member, such as C. Also, the gauge or device may find use in other manners.

The flat side of the measuring rod 22 may have a scale 37 engraved thereon for quick observation with reference to the base surface 11 of stock 10 in the taking of rough trial measurements during the progress of a particular piece of work.

Changes in the specific form of my invention, as herein disclosed, may be made within the scope of what is claimed without departing from the spirit of my invention.

Having described my invention, what I claim as new and desire to protect by Letters Patent is:

1. In a gauge, a stock having a measuring face and formed with a guideway therein, a measuring rod longitudinally slidable in said guideway and adapted to be projected outwardly from the stock beyond said measuring face, a spring acting to thus project the measuring rod, said rod having a flat surface longitudinally thereof and a stop shoulder at its inner end aligned with said flat surface, a latch member carried by said stock and movable into and out of said guideway, a spring acting on said latch member to move the same into the path of said shoulder in said guideway, said latch member serving to engage the stop shoulder and thereby limit the projection of the measuring rod under the action of said first spring, but being adapted, upon the application of additional force to said rod, to move out of said guideway and free the rod for removal from the stock, said latch member having a portion cooperating with said flat surface of said rod to maintain the angular disposition of the rod relative to the stock and thereby keep the stop shoulder on said rod operatively disposed with respect to said latch member, and means for securing the measuring rod in any of its various longitudinally assumed positions relative to said stock.

2. In a gauge, a stock having a measuring face and formed with a guideway thereon, a measuring rod slidable in said guideway and adapted to be projected outwardly from the stock beyond said measuring face, a spring acting to thus project the measuring rod, said rod having a flat surface longitudinally thereof and a stop shoulder at its inner end aligned with said flat surface, a yielding latch member carried by the stock and disposed to engage the stop shoulder on the measuring rod and thereby limit the projection of said rod by the action of said spring, said flat surface of said rod bearing a scale and cooperating with said latch member normally to preserve a given angular relation between the rod and stock, and means for securing the measuring rod in any of its various longitudinally assumed positions relative to said stock.

3. In a gauge, a stock having a bottom face adapted to be applied to the work, said stock having a guideway therein open at the bottom thereof, a measuring rod longitudinally slidable in said guideway and adapted to be projected outwardly from the stock beyond said bottom face thereof, a spring acting to thus project the measuring rod, and means for securing said rod in its various longitudinally assumed positions relative to said stock, said means including a clamp screw threaded into the stock from the top thereof, the inner end of said screw having a conical cam thereon, said means also including a clamping pin slidable in the stock and disposed endwise between the measuring rod and clamping screw, the end of the pin adjacent to the clamp screw being adapted to be engaged by the cam thereon to advance the pin toward the measuring rod, the end of said pin adjacent to said rod being adapted to engage the rod and secure the same against movement in its guideway.

4. In a gauge, a stock having a bottom face adapted to be applied to the work, said stock having a guideway therein open at the bottom thereof, a measuring rod longitudinally slidable in said guideway and adapted to be projected outwardly from the stock beyond said bottom face thereof, a spring acting to thus project the measuring rod, and means for securing said rod in its various longitudinally assumed positions relative to said stock, said means including a clamp screw threaded into the stock from the top thereof, the inner end of said screw having a conical cam thereon and an axial terminal stop issuing from said cam, said means also including a clamping pin slidable in the stock and disposed endwise between the measuring rod and clamping screw, the end of the pin adjacent to the clamp screw being adapted to be engaged by the cam thereon to advance the pin toward the measuring rod, the end of said pin adjacent to said rod being adapted to engage the rod and secure the same against movement in its guideway, said terminal stop on the clamp screw serving to keep the pin from sliding under the screw and past the axis thereof when said screw is loosened to free said rod.

FRANK J. VIERLING.